United States Patent [19]

McCoy et al.

[11] 4,382,852
[45] May 10, 1983

[54] DEMULSIFICATION OF BITUMEN EMULSIONS USING CATIONIC POLYMERS

[75] Inventors: David R. McCoy, Austin, Tex.; Kitchener B. Young, Fort McMurray, Canada

[73] Assignees: Texaco Canada Resources, Inc., Calgary, Canada; Texaco Inc., White Plains, N.Y.

[21] Appl. No.: 326,454

[22] Filed: Dec. 2, 1981

[51] Int. Cl.$^3$ .................... C10G 33/04; C30B 3/00; C09K 3/00
[52] U.S. Cl. .................... 208/188; 252/358; 210/708; 210/732; 210/736; 210/737
[58] Field of Search .................... 208/188; 252/358; 210/708, 732, 736, 737

[56] References Cited

U.S. PATENT DOCUMENTS

| | | | |
|---|---|---|---|
| Re. 29,908 | 2/1979 | Fowler et al. | 252/358 |
| 3,205,169 | 9/1965 | Kirkpatrick et al. | 564/285 |
| 3,251,882 | 5/1966 | Kirkpatrick et al. | 252/344 |
| 3,272,757 | 9/1966 | Kirkpatrick et al. | 252/344 |
| 3,296,117 | 1/1967 | Ross et al. | 208/188 |
| 3,304,349 | 2/1967 | Shen | 252/358 |
| 3,493,502 | 2/1970 | Coscia | 210/54 |
| 3,523,892 | 8/1970 | Schiegg | 210/54 |
| 3,591,520 | 7/1971 | McDonald | 252/329 |
| 3,782,472 | 1/1974 | Siess, Jr. | 166/303 |
| 3,855,299 | 12/1974 | Witt | 252/358 |
| 3,900,423 | 8/1975 | Markofsky | 252/358 |
| 4,058,453 | 11/1977 | Patel et al. | 252/329 |
| 4,059,515 | 11/1977 | Fowler et al. | 252/358 |
| 4,252,746 | 2/1981 | Kwong | 252/403 |

FOREIGN PATENT DOCUMENTS 1096964 12/1967 United Kingdom .................. 210/84

Primary Examiner—Delbert E. Gantz
Assistant Examiner—Helane E. Maull
Attorney, Agent, or Firm—Jack H. Park; Kenneth R. Priem; David L. Mossman

[57] ABSTRACT

A process for recovering bitumen from oil-in-water (O/W) emulsions is disclosed wherein water soluble demulsifiers are used. These demulsifiers are cationic polymers of equal to or greater than about 2,000 molecular weight obtained by the reaction of polyalkoxydiamines with epihalohydrins. To resolve the bituminous petroleum emulsions, the process is carried out between 25° and 160° C. wherein the demulsifier of the invention is contacted with the bituminous emulsion.

5 Claims, No Drawings

DEMULSIFICATION OF BITUMEN EMULSIONS USING CATIONIC POLYMERS

BACKGROUND OF THE INVENTION

1. Field of the Invention

This invention is concerned with the breaking or resolution of oil-in-water (O/W) bituminous emulsions by treatment with cationic polymers.

2. Description of Related Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semisolid. These bituminous hydrocarbons are usually characterized by being very viscous or even non-flowable under reservoir conditions by the application of driving fluid pressure.

Where surface mining is not feasible, the bitumen must be recovered by rendering the tar material mobile in-situ and producing it through a well penetrating the tar sand deposit. These in-situ methods of recovery include thermal, both steam and in-situ combustion and solvent techniques. Where steam or hot water methods are used, a problem results which aggravates the recovery of the bitumen. The difficulty encountered is emulsions produced by the in-situ operations. These emulsions are highly stable O/W emulsions which are made even more stable by the usual presence of clays. Most liquid petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions. The following is a list of art references.

A. C. W. W. Gewers, *J. Canad. Petrol. Tech.*, 7(2), 85–90 (1968) describes the uniqueness of emulsions encountered in the production of bitumen from tar sands.

B. U.S. Pat. No. 4,252,746 discloses the composition used in the present invention.

C. U.S. Pat. No. 4,058,453 (Texaco) describes the use of poly(ethylene oxides) of >1 million molecular weight for breaking bitumen emulsions.

D. U.S. Pat. No. 3,296,117 (Esso) claims a tar demulsifier system consisting of (1) diethylethanolamine polyalkoxylate plus (2) palmitic acid ester of an ethoxylated alkylphenol-formaldehyde adduct.

E. U.S. Pat. No. 3,782,472 (Petrolite) reveals the use of amino alkoxylates as demulsifiers for steam injection into sub-surface oil-producing formations and subsequent hydrocarbon recovery.

F. Various cationic flocculants are claimed in the literature including epichlorohydrin (ECH) adducts with 1. Lower secondary amines (U.S. Pat. Nos. 3,738,945 and 3,894,944)
2. Lower secondary amines plus polyalkylenepolyamine or polypropoxydiamine (U.S. Pat. No. 3,738,945)
3. Linear polyalkylene polyamines (U.S. Pat. No. 3,523,892)
4. Polyalkylenepolyamines plus alkylene dihalides (British Pat. No. 1,096,964)
5. Lower primary monoamines (U.S. Pat. No. 3,493,502).

G. U.S. Pat. No. 4,029,078—Demulsifiers prepared by reacting epichlorohydrin with the 8 mole propoxylate of $H_2N(CH_2)_6NH_2$.

H. U.S. Pat. No. Re. 29,908 (Betz)—Oil separated from oil-containing wastewater using polymer of ECH and $$\begin{array}{c} R \\ \diagdown \\ N-R'-NH_2 \\ \diagup \\ R \end{array}$$

where R=alkyl and R'=alkylene.

I. U.S. Pat. No. 3,251,882 (Nalco)—O/W emulsions broken by polymers from ECH plus a condensate of a polyalkylene polyamine and a poly(oxyalkylene) glycol chloride.

J. U.S. Pat. No. 3,251,882 (Nalco)—O/W emulsions broken by polymers from (a) ECH and polyalkylene polyamines, and (b) ECH and aliphatic glycols.

K. U.S. Pat. No. 3,251,882 (Nalco)—O/W emulsions broken by polymers from ECH, ECH adduct of an aliphatic glycol, and a polyalkylene polyamine.

L. U.S. Pat. No. 3,205,169—O/W emulsions broken using an adduct of ECH plus dipropylenetriamine plus $C_{12-18}$ primary amines.

M. U.S. Pat. No. 3,272,757—O/W emulsions broken using adducts of ECH plus polyalkylene polyamines.

N. U.S. Pat. No. 3,591,520—O/W emulsions broken using adducts of poly(epichlorohydrin), trimethylamine, and ethoxylated dimethylamine.

O. U.S. Pat. No. 3,900,423—O/W or W/O emulsions broken with adducts of ECH plus primary alkylamines or alkylenepolyamines plus secondary alkylamines or alkylene polyamines having 1–6 secondary amine groups per molecule.

SUMMARY OF THE INVENTION

The invention is a method for recovering petroleum from oil-in-water bitumen emulsions by resolving or breaking these emulsions by contacting the emulsions at a temperature of between 25° and 160° C. with cationic polymers of equal to or greater than about 2,000 molecular weight obtained by the reaction of polyalkoxydiamines of the following structure $$O[(CH_2CH_2O)_m(CH_2CHO)_nCH_2CHNH_2]_2 \atop \phantom{O[(CH_2CH_2O)_m(CH_2CHO)_n}CH_3 \phantom{CH_2CH}CH_3$$

where m=1 through 70 and n=0 through 5 with greater than about six-tenths to less than about 2.0 moles of epihalohydrin at temperatures above about 50° C. in hydrocarbon or aqueous solvent or neat with or without added catalyst.

DESCRIPTION OF THE PREFERRED EMBODIMENTS

The process of this invention utilizing the chemical demulsifier as described above utilizes as a chemical demulsifier a particular cationic polymer which is disclosed in U.S. Pat. No. 4,252,746 which is incorporated herein by reference.

Useful in this process are cationic polymers of equal to or greater than about 2,000 molecular weight obtained by the reaction of polyalkoxydiamines of the following structure

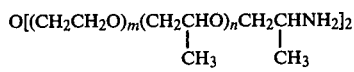

where m=1 through 70 and n=0 through 5 with greater than about six-tenths to less than about 2.0 moles of epihalohydrin at temperatures above about 50° C. in hydrocarbon or aqueous solvent or neat with or without added catalyst.

The reaction of the polyalkoxydiamines with the epihalohydrins may be carried out under conditions specified above without catalysis. However, with added catalysts, reaction advantages may be obtained. Useful catalysts may be generally described as inorganic bases or Lewis acids. Specific catalysts include sodium hydroxide, potassium hydroxide, boron trifluoride and stannic chloride. Although it is advantageous to have as the lower molecular weight limit about 2,000, the upper molecular weight limit is only limited in that the polymer must be soluble in water.

The epihalohydrins useful in forming the polymer of this invention include epichlorohydrin and epibromohydrin.

Especially preferred are demulsifiers with the following characteristics: polymers >5,000 molecular weight prepared from the reaction of epichlorohydrin and polyalkoxydiamines of the structure previously shown wherein m=4-25 and n=0-2.

The produced bitumen emulsions may be treated by the process of our invention in a conventional manner, for example, in a conventional horizontal treater operated, for example, from about 25° to 160° C. and, preferably, from about 50° to 150° C. at autogenous pressures. The concentration of the chemical demulsifier described above used in treating the bitumen in water emulsions may range from about 1 to 200 parts per million and, preferably, from about 10 to 150 parts per million with the optional addition of an organic diluent and/or inorganic salt as well as standard flocculants and mechanical or electrical means of demulsification.

The following examples describe more fully the present process. However, these examples are given for illustration and are not intended to limit the invention.

EXAMPLE I

A 500 ml flask was charged with 100 g JEFFAMINE® ED-2001, a Texaco Chemical Company product with average composition $O[(EO)_{20.9}(PO)_{0.75}(CH_2CH(CH_3)NH_2)]_2$ and 100 g water. The solution was heated with mechanical stirring to 60° C. under nitrogen atmosphere and 1.3 moles epichlorohydrin (ECH) were added over 5 minutes. The solution was heated to 85° C. over one hour with stirring, followed by an additional 2 hours at 85° C. Water (6 g) was added to give a 50 wt.% solution of a polymer having an approximate molecular weight of 13,000 as determined by high performance liquid chromatography using a 3,000 PW Toyo Soda column and aqueous solvent system with poly(ethyleneoxy)glycol standards. The product solution had a 25° C. kinematic viscosity of 142 cS.

EXAMPLE II

JEFFAMINE ED-2001+ECH In a Non-Aqueous Solvent

The procedure of Example I was repeated using xylenes in place of $H_2O$ as solvent. After ECH addition, the mixture was heated from 70° C. to 138° C. over 2 hours and held at 138°-140° C. for an additional 4½ hours at which point the reaction product began to become very viscous. Product molecular weight was approximately 66,000 by liquid chromatography.

EXAMPLE III

JEFFAMINE ED-900+ECH

The procedure of Example II was repeated using JEFFAMINE ED-900 with average composition

1.4 moles ECH, 3 hour heating-up period, and 25 minutes at reflux. The resulting polymer had an approximate molecular weight of 59,000.

EXAMPLE IV

Insoluble Polymer from JEFFAMINE ED-600 and ECH

The procedure of Example III was repeated using JEFFAMINE ED-600 with average composition

After 2½ hour heating-up period the reaction mass became a gel with the solids completely insoluble in $H_2O$ or hydrocarbon solvents.

EXAMPLE V

JEFFAMINE M-1000+ECH

Repeated procedure of Example II using JEFFAMINE M-1000 having average composition

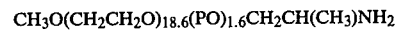

and 1.0 mole ECH. Gel permeation chromatography using PPG standards indicated a product molecular weight of approximately 3,500. This product solution was further heated to 220° C. over a 1¼ hour period while removing solvent. Molecular weight of the final product was 4,000 by gel permeation chromatography.

EXAMPLE VI

Soluble Polymer from JEFFAMINE ED-600+ECH

Procedure of Example IV was repeated using toluene in place of xylene. After addition of ECH at 55° C., the reaction mixture was heated to 110° C. over a 1 hour period, followed by reflux at 110°-114° C. for 1½ hours until the viscosity increase became quite noticeable. Enough toluene was added to prepare a 50% polymer solution, which was cooled to room temperature. Product molecular weight was 3,500 by gel permeation chromatography.

EXAMPLE VII

Procedure of Example III was repeated with 1 mole ECH. Product molecular weight was 5,300 by gel permeation chromatography.

EXAMPLE VIII

Procedure of Example III was repeated with 2 moles ECH. Reflux was stopped after ⅓ hour. Product molecular weight was 5,300 by gel permeation chromatography.

EXAMPLE IX

Procedure of Example VI was repeated using JEFFAMINE D-230 with average composition

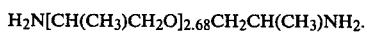

After 20 minutes reflux period the reaction mixture was cooled to room temperature. A two-phase mixture resulted. The top layer was decanted off and bottom layer was vacuum stripped to remove solvent. The product was a rubber-like solid with bulk of material below 6,000 molecular weight.

EXAMPLE X

A 1-liter flask was charged with 200 g JEFFAMINE ED-600 and 232 g toluene. At 55° C. with stirring under nitrogen atmosphere was added 1 mole of epichlorohydrin. The mixture was heated to reflux over 1 hour and refluxed for 3 hours at 113°–114° C. Liquid chromatography showed that 80% of the product had an average molecular weight of approximately 24,000.

EXAMPLE XI

The procedure of Example X was repeated using 2 moles epichlorohydrin. After 34 minutes reflux period the reaction was stopped. Average molecular weight of product was about 23,000.

EXAMPLE XII

Charged 1 liter flask with 200 g JEFFAMINE M-360 having average composition

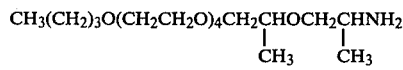

and 200 g xylene. Heated mixture with stirring under $N_2$ atmosphere to 70° C. and added 2 moles ECH over 25 minutes. Heated to reflux (148° C.) over 1 hour and 50 minutes and refluxed for an additional 3 hours and 10 minutes. Liquid chromatography of the product showed an average molecular weight of 3,000.

EXAMPLE XIII

Charged 1-liter resin flask with 150 g JEFFAMINE D-230 and 400 g toluene. Heated to 55° C. and added 1 mole ECH over 20 minutes. Heated to reflux (111°–113°) over 1 hour and digested at reflux for an additional hour. Liquid chromatography showed two major product peaks at approximately 8,000 and 5,000 molecular weight.

EXAMPLE XIV

The procedure of Example XIII was repeated using 2 moles ECH. Stopped reaction after ½ hour reflux period, cooled and decanted off top layer. Bottom product layer was dried under reduced pressure. It demonstrated product peaks at approximately 4,000 and 8,000 molecular weight in the liquid chromatogram.

EXAMPLE XV

A 1-liter resin flask was charged with 100 g JEFFAMINE ED-600 and 200 g $H_2O$. The solution was heated with stirring to 60° C. and 1.4 moles ECH were added over 13 minutes. The mixture was heated to 85° C. and held at 85° for an additional 3½ hours. Digestion at 85° for a further 8 hours led to no additional increase in solution viscosity. Liquid chromatographic analysis showed an average molecular weight of approximately 6,200 for the product.

EXAMPLE XVI

The procedure of Example XV was repeated using JEFFAMINE M-360 in place of ED-600 and 2 moles ECH in place of 1.4 moles. Liquid chromatographic analysis showed that 90% of the product was below 600 in molecular weight.

EXAMPLE XVII

A 1-liter flask was charged with 100 g JEFFAMINE M-360 and 400 g $H_2O$. ECH (0.87 moles) was added over 1 hour at 25°–80° C. followed by addition of 14 g of 36% NaOH solution at 85° and 1.37 moles ECH at 95° over a 2 hour period. The mixture was refluxed for 5 hours and cooled to room temperature. Solvent was decanted off of the two-phase product mixture and the residue acidified to pH 5.3 with concentrated hydrochloric acid. The product solution weighed 153 g and contained 34 wt.% $H_2O$. Analysis of this product by liquid chromatography on an amine-modified size-exclusion column showed (in addition to light ends) that approximately 41% of the product had an average molecular weight of 13,300 with 57% at less than 12,000 molecular weight basis polyacrylamide standards.

EXAMPLE XVIII

The procedure of Example XV was repeated using 2 moles ECH and 3½ hour reflux period. Liquid chromatographic analyses showed 68.8 area percent of the product at approximately 26,000 molecular weight and 31.2% at 12,000.

EXAMPLE XIX

The procedure of Example X was repeated using 0.6 moles ECH and 1½ hour reflux period. The product polymer (isolated by removal of solvent under reduced pressure) was shown to have 2.36 meq/g free amine and 0.45 meq/g amine hydrochloride. Liquid chromatographic analyses showed >90% of the product to have a 13,000 molecular weight.

EXAMPLE XX

Polymer from DUOMEEN® CD and Epichlorhydrin

A 1-liter resin flask was charged with 120 g DUOMEEN CD (commercial diamine of structure $RNHCH_2CH_2CH_2NH_2$ prepared from cocoamine) and 300 g toluene. The mixture was heated under $N_2$ with stirring to 55° C. and 1.5 moles epichlorohydrin were added over 25 minutes. The mixture was heated to reflux (110° C.) over 37 minutes and refluxed at 110° C. for 6 hours. Removal of solvent gave a red solid analyzing for 2.14 meq/g free amine and 2.96 meq/g amine hydrochloride.

EXAMPLES XXI AND XXII

Table I contains results of tests performed. The following basis testing procedure was employed:
(a) A 1% solution of each chemical was prepared (in $H_2O$ or in toluene).
(b) 100 ml of fresh, hot bitumen emulsion of known bitumen content obtained by in-situ steam flooding in tar sand pattern located at Ft. McMurray, Alberta, Canada was poured into a sample bottle.

(c) 50 parts (volume) of Wizard Lake crude was added as diluent to 100 parts bitumen contained in the emulsion.

(d) Chemical was added to the diluted emulsion at the following concentrations: 10, 20, 30, 50, 75 and 100 ppm.

(e) Contents of the bottles were mixed and placed in an oven at 180°–200° F. for a 24-hour period.

(f) BS&W determinations were made on the oil layer.

With each emulsion, a blank was also run in which no chemical agent was introduced. Similar results were obtained from all these blanks; namely, the sample consisted of a thin upper layer consisting mainly of diluent (sometimes containing substantial water), a broad middle layer consisting of unbroken emulsion, and a small (sometimes non-existent) dark water layer containing particles or chunks of solid bitumen and clay.

Table II contains examples of tests performed. The following basic testing procedure was employed:

a. A 1 weight percent solution of each chemical was prepared (in water or acetone).

b. A 30 ml PYREX ® test tube equipped with screw top was charged with 23 ml emulsion of 11.5 weight percent bitumen content obtained by in-situ steam flooding in tar sand c. 2 ml Wizard Lake crude oil was added as diluent and the contents of the test tube were mixed.

d. The contents of the test tube were equilibrated in a 80° C. oven for 1–2 hours and mixed again.

e. Chemical was added to the hot, dilute emulsion at the following concentrations: 60, 120 ppm.

f. Contents of the test tubes were mixed, re-equilibrated in an oven at 80° C. for 1 hour and mixed again.

g. After 20 hours of standing at 80° C., measurements were made on the volume of top and middle layers, and the appearance of the aqueous phase was noted. Samples of some top layers were carefully removed by pipetting and subjected to Karl-Fischer analysis for determination of the water content.

As well as containing illustrative examples of the invention, these examples also include comparisons run on identical emulsions in which no demulsifier was used or in which POLYOX ® WSR-301 [4,000,000 molecular weight poly(ethylene oxide)] was employed. Inoperative examples are also given including runs in which a non-polyether diamine was used as starting material for polymer formation (run XX above, tested in XXII l and m), a monoamine was employed (XXII n and o), an all polypropoxydiamine was used; i.e. m=0 (XXIIa, e and f), ECH:diamine ratio was too lower (XXII s and t), and ECH:diamine ratio was too high (XXIj, XXIId, q and r).

TABLE I
DEMULSIFIER TESTING

| Example XXI | Candidate Demulsifier | % Bitumen in Emulsion | BS&W in Oil (ppm chemical used) | Treated Emulsion Middle Phase | Water Phase |
|---|---|---|---|---|---|
| a | Example I | 22 | 6 (20), 5 (50) | Little | Muddy |
| b | Example II | 22 | 5 (20), 6 (100) | Slight | Medium to light, muddy |
| c | Example III | 22 | 4 (20), 3 (100) | Slight | Medium to dark, muddy |
| d | POLYOX WSR-301 | 22 | 8 (20), 2 (50) | Very large, unstable | Translucent to cloudy |
| e | None | 22 | 16 | Very wide | Dark, muddy with deposit |
| f | Example VI | 19 | 2.5 (20,50) | Small to none | Muddy, medium brown |
| g | Example VII | 19 | 3 (50), 4 (100) | Slight | Muddy, medium brown |
| h | POLYOX WSR-301 | 19 | 3 (20), 6 (50) | Small to large | Just translucent to light muddy |
| i | None | 19 | 30 | Moderate | Dark, muddy with deposit |
| j | Example VIII | 14 | 50 (20), 18 (100) | Moderate to slight | Dark, muddy with deposit |
| k | None | 14 | 46 | Moderate | Dark, muddy with deposit |

Note:
Horizontal lines group tests done on same day.

TABLE II
DEMULSIFIER TESTING

| Example XXII | Candidate Demulsifier | Concentration ppm | Oil Phase Vol. in ml (% H₂O) | Emulsion Phase Vol. in ml (% H₂O) | Aqueous Phase Appearance |
|---|---|---|---|---|---|
| a | Example IX | 60 | 3 | 2.5 | Light, muddy |
| b | None | — | 2.5 | 2 | Muddy |
| c | Example X | 60 | 2.5 | 1 | Muddy |
| d | Example XI | 60 | 2.5 | 1.5 | Muddy |
| e | Example XIII | 60 | 2 | 2 | Muddy |
| f | Example XIV | 60 | 2 | 2.5 | Muddy |
| g | None | — | 2 | 2 | Muddy |
| h | Example XV | 60 | 5.5 (4.3) | 1 | Muddy |
| i | Example XV | 120 | 5.5 (6.9) | 1.5 | Muddy |
| j | POLYOX WSR-301 | 120 | 8.5 (41.2) | — | Yellow, translucent |
| k | None | — | 1.5 | 2.5 | Muddy |
| l | Example XX | 60 | 2 | 2 | Muddy |
| m | Example XX | 120 | 2 | 2 | Muddy |
| n | Example XVII | 60 | 2 | 1.5 | Muddy |
| o | Example XVII | 120 | 2 | 2 | Muddy |
| p | None | — | 2 | 2 | Muddy |
| q | Example XVIII | 60 | 4 | 2 | Muddy |
| r | Example XVIII | 120 | 4 | 1.5 | Muddy |
| s | Example XIX | 60 | 3 | 2 | Muddy |
| t | Example XIX | 120 | 3.5 | 2 | Muddy |
| u | None | — | 3.5 | 2 | Muddy |

We claim:

1. A process for recovering petroleum from O/W bitumen emulsions by demulsifying said emulsions by contacting the emulsions at a temperature of between 25° and 160° C. with cationic polymers of equal to or greater than about 2,000 molecular weight obtained by the reaction of polyalkoxydiamines of the following structure

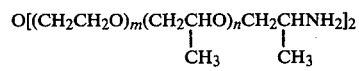

where m=1 through 70 and n=0 through 5 with greater than about 0.6 to less than about 2.0 moles of epihalohydrin at temperatures above about 50° C. in hydrocarbon or aqueous solvent or neat with or without added catalyst.

2. A process as in claim 1 wherein the epihalohydrin is epichlorohydrin.

3. A process as in claim 1 wherein m=about 4 to about 25 and n=about 0 to about 2.

4. A process as in claim 1 wherein the cationic polymer has a molecular weight greater than about 5,000.

5. A process for recovering petroleum from O/W bitumen emulsions by demulsifying said emulsions by contacting the emulsions at a temperature of between 25° and 160° C. with cationic polymers of equal to or greater than about 5,000 molecular weight obtained by the reaction of polyalkoxydiamines of the following structure $$O[(CH_2CH_2O)_m(CH_2CHO)_nCH_2CHNH_2]_2$$
$$\phantom{O[(CH_2CH_2O)_m(}CH_3\phantom{)_nCH_2}CH_3$$

where m=about 4 to about 25 and n=0 to about 2 with greater than about 0.6 to less than about 2.0 moles of epichlorohydrin at temperatures above about 50° C. in hydrocarbon or aqueous solvent or neat with or without added catalyst.

* * * * *